(12) United States Patent
Kärkkäinen et al.

(10) Patent No.: US 9,413,797 B2
(45) Date of Patent: *Aug. 9, 2016

(54) DATA COMMUNICATION SYSTEM AND METHOD

(71) Applicant: GURULOGIC MICROSYSTEMS OY, Turku (FI)

(72) Inventors: Tuomas Mikael Kärkkäinen, Turku (FI); Valtteri Hakkarainen, Turku (FI); Ossi Kalevo, Akaa (FI); Jani Yli-Alho, Kaarina (FI)

(73) Assignee: Gurulogic Microsystems Oy, Turku (FI)

( * ) Notice: Subject to any disclaimer, the term of this patent is extended or adjusted under 35 U.S.C. 154(b) by 16 days.

This patent is subject to a terminal disclaimer.

(21) Appl. No.: 14/658,908

(22) Filed: Mar. 16, 2015

(65) Prior Publication Data

US 2015/0189008 A1 Jul. 2, 2015

Related U.S. Application Data

(63) Continuation-in-part of application No. 14/246,570, filed on Apr. 7, 2014, now Pat. No. 8,984,158.

(30) Foreign Application Priority Data

Apr. 23, 2013 (GB) .................................. 1307341.6

(51) Int. Cl.
*G06F 15/16* (2006.01)
*H04L 29/06* (2006.01)
(Continued)

(52) U.S. Cl.
CPC ............ *H04L 65/403* (2013.01); *H04L 69/165* (2013.01); *H04N 7/15* (2013.01);
(Continued)

(58) Field of Classification Search
USPC ......... 709/203, 204, 206, 217, 219, 223, 224, 709/226, 228, 232, 238; 370/216, 235; 348/716
See application file for complete search history.

(56) References Cited

U.S. PATENT DOCUMENTS 5,574,934 A 11/1996 Mirashrafi et al.
6,088,391 A * 7/2000 Auld ...................... H04N 19/61
 348/716

(Continued)

FOREIGN PATENT DOCUMENTS

EP 2 408 205 A1 1/2012

OTHER PUBLICATIONS

PCT Written Opinion of the International Preliminary Examining Authority mailed Mar. 24, 2015, which was issued by IPEA/EP in related PCT application No. PCT/EP2014/001050 (6 pages).
Examination Report under Sections 18(3) dated Apr. 29, 2015 issued by the U.K Intellectual Property Office in U.K. Patent Application No. GB 1307341.6 (3 pages).

(Continued)

*Primary Examiner* — Quang N Nguyen
(74) *Attorney, Agent, or Firm* — Robert P. Michal, Esq.; Carter, DeLuca, Farrell & Schmidt, LLP

(57) ABSTRACT

A data communication system includes a centralized server arrangement coupled via a communication network arrangement to a plurality of client devices. The centralized server arrangement and the plurality of client devices exchange data. The system allocates the data into a primary type of data and at least a secondary type of data. The primary data is communicated substantially immediately within the system, and the at least secondary data is communicated in the system in association with corresponding acknowledgements (ACK) in response to receipt and processing of the at least secondary type of data at one or more of the client devices. At least one of the one or more client devices is optionally a wireless-enabled mobile communication device or a wirelessly-connected personal computer (PC).

36 Claims, 3 Drawing Sheets

(51) Int. Cl.
*H04N 7/15* (2006.01)
*H04N 21/2343* (2011.01)
*H04N 21/238* (2011.01)
*H04N 21/643* (2011.01)
*H04N 21/4788* (2011.01)
*H04N 21/63* (2011.01)
*H04L 29/08* (2006.01)

(52) U.S. Cl.
CPC ........ *H04N 21/238* (2013.01); *H04N 21/2343* (2013.01); *H04N 21/4788* (2013.01); *H04N 21/631* (2013.01); *H04N 21/643* (2013.01); *H04N 21/64322* (2013.01); *H04L 67/104* (2013.01)

(56) References Cited

U.S. PATENT DOCUMENTS

| | | | |
|---|---|---|---|
| 6,646,674 | B1 | 11/2003 | Kato |
| 7,053,923 | B1 | 5/2006 | Hamilton |
| 7,397,759 | B2 * | 7/2008 | Tan .................... H04L 1/188 370/216 |
| 7,757,028 | B2 | 7/2010 | Druke et al. |
| 8,121,117 | B1 | 2/2012 | Amdahl et al. |
| 8,169,911 | B2 * | 5/2012 | Viger .................... H04L 47/10 370/235 |
| 2004/0082339 | A1 | 4/2004 | Lee |
| 2004/0228351 | A1 | 11/2004 | Richter et al. |
| 2005/0089035 | A1 | 4/2005 | Klemets et al. |
| 2005/0262251 | A1 | 11/2005 | Klemets et al. |
| 2009/0043934 | A1 | 2/2009 | Bjerregaard |
| 2010/0002692 | A1 | 1/2010 | Bims |
| 2010/0220593 | A1 | 9/2010 | Fujiwara et al. |
| 2012/0140018 | A1 | 6/2012 | Pikin et al. |
| 2013/0066951 | A1 | 3/2013 | Agranat et al. |
| 2013/0314608 | A1 | 11/2013 | Ito et al. |

OTHER PUBLICATIONS

UKIPO Search Report under Sections 17 which was mailed Oct. 31, 2013 and issued in a related GB Application No. GB1307341.6 (4 pages).

Request for Comments (RFC) Memoranda No. 793, "Transmission Control Protocol: DARPA Internet Program Protocol Specification," The Internet Engineering Task Force (IETF), https://tools.ietf.org/html/rfc793, Sep. 1981 (89 pages).

J. Postel, RFC Memoranda No. 768, "User Data Protocol," The Internet Engineering Task Force (IETF), http://tools.ietf.org/pdf/rfc768.pdf, Aug. 28, 1980 (3 pages).

H. Parmar & M. Thornburgh, "Adobe's Real Time Messaging Protocol (RTMP) Specification," Adobe Developer Connection, http://adobe.com/adevnet/rtmp.html, Dec. 21, 2012 (52 pages).

Wikipedia, "Maximum transmission unit," http://en.wikipedia.org/wiki/Maximum_transmission_unit, accessed Feb. 6, 2013, (5 pages).

Information Sciences Institute at University of Southern California, Request for Comments (RFC) Memoranda No. 791, "Internet Protocol: DARPA Internet Program Protocol Specification," published Sep. 1981, http://datatracker.ietf.org/doc/rfc791/ (51 pages).

Wikipedia, "Internet Protocol," http://en.wikipedia.org/wiki/Internet_Protocol, accessed Feb. 6, 2013, (5 pages).

Wikipedia, "Network socket," http://en.wikipedia.org/wiki/Network_socket, accessed Feb. 6, 2013, (4 pages).

John Nagle of Ford Aerospace and Communications Corporation, "Congestion Control in IP/TCP Internetworks," Request for Comments (RFC) Memoranda No. 896, http://tools.ietf.org/html/rfc896, Jan. 6, 1984 (9 pages).

PCT International Search Report mailed Sep. 5, 2014, which was issued by ISA/EP in a related PCT application No. PCT/EP2014/001050 filed Apr. 21, 2014 (5 pages).

PCT Written Opinion mailed Sep. 5, 2014, which was issued by ISA/EP in a related PCT application No. PCT/EP2014/001050 filed Apr. 21, 2014 (5 pages).

* cited by examiner

DATA COMMUNICATION SYSTEM AND METHOD

CROSS REFERENCE TO RELATED APPLICATION

This application is a continuation-in-part of U.S. patent application Ser. No. 14/246,570, filed Apr. 7, 2014, which claims the benefit under 35 U.S.C. §119(a) and 37 CFR §1.55 to UK Patent Application No. 1307341.6, filed on Apr. 23, 2013, the entire disclosure of each of which is incorporated herein by reference.

TECHNICAL FIELD

The present disclosure relates to data communication systems, for example to data communication systems for communicating audio and video information between mutually different client devices; peer-to-peer and multipoint communication systems can be used with the present disclosure, as well as the present disclosure is suitable also for unicast, multicast and multi-unicast (XCAST) routing schemes. Moreover, the present disclosure is also concerned with methods of operating aforesaid data communication systems. Furthermore, the present disclosure is also concerned with software products recorded on machine-readable data storage media, wherein the software products are executable upon computing hardware for implementing aforesaid methods.

BACKGROUND INFORMATION

Communication systems employing data packet communication via a data communication network, for example the Internet, are well known. For example, Voice-over-Internet-Protocol (VoIP) has been known for many years and is employed in contemporary communication products such as Skype telephonic and video-conferencing services; "Skype" is a registered trademark. When a plurality of persons are employing VoIP and associated video conferencing products, it is found desirable that voice and video information are communicated without gross delay, otherwise maintaining a conversation or video conference becomes difficult for the participating persons. However, the Internet was conceived to be a data packet communicating network, wherein data packets can potentially take a multiplicity of routes within the Internet from a sending device to a receiving device. As a result, it is often difficult when using the Internet to ensure prompt delivery of a data packet from the sending device to the receiving device, resulting in potential latency being experienced by users. Aforementioned communication issues are addressed in a known document "Real-Time Messaging Protocol (RTMP) specification, Adobe Developer Connection", URL: http://www.adobe.com/devnet/rtmp.html.

A problem encountered with known real-time communication systems, and associated methods employing communication networks such as the Internet, is that the methods do not adequately integrate video and audio codecs into their execution. Devices including such codecs are often mutually different in respect of their processing power, which affects their rate of processing received data and also generating data for transmission. Moreover, infrastructures employed for implementing, for example, the Internet can vary considerably for various individual client devices, for example depending upon a geographical location of the individual client devices. When executing audio conferencing and/or video conferencing between a plurality of parties, audio delays of merely a couple of seconds to words at an end of a sentence can potentially render the sentence potentially unintelligible to parties participating to the conferencing.

Thus, known real-time communication systems have to take into account properties of communication infrastructures, for example communication networks, employed to convey data packets; the infrastructures can vary considerably for various individual client devices. For example, it is desirable that audio information transmitted between parties, for example their client devices, is conveyed with a delay not exceeding a few ten's of milliseconds. Such delay of a few ten's of milliseconds is usually achievable, provided that video information is not concurrently also transmitted. In comparison to audio information pertaining to a given period of time, corresponding video information pertaining to the same given period of time results in generation of data which is typically at least an order of magnitude greater in size in comparison to that of the audio information; however, a ratio of size of audio data to corresponding video data will depend upon quality criteria pertaining to the video information and the audio information, for example video pixel field resolution and video frame update rate.

From the foregoing, it will be appreciated that known systems for communicating audio and video information between a plurality of parties, for example in a video conferencing situation, via a communication network such as the Internet, are not optimal in their manner of operation, especially when parties employ mutually different devices with associated mutually different data processing characteristics.

In this disclosure, acronyms and definitions are employed as provided in Table 1.

TABLE 1

Acronyms and definitions

| Abbreviation or acronym | Definition |
|---|---|
| ACK | This fundamental technique requires a receiver to respond with an acknowledgment message as it receives given data |
| CPU | Central Processing Unit |
| Frame Rate | "Frame frequency", namely a frequency rate at which an imaging device produces unique consecutive images, referred to image "frames"; "frames" in this context are not to be confused with network packets. Moreover, there are also mentioned "audio frames" which include some predetermined sequence of audio sample data |
| MSS | Maximum Segment Size of a communication protocol |
| MTU | Maximum Transmission Unit of a communication protocol |
| NIC | Network Interface Controller, namely "network interface card" |
| Packet Rate | A frequency at which packets of data can be delivered via a network; in an event that packet receipt acknowledgements are needed, such frequency is generally decreased |
| RTMP | Real-Time Messaging Protocol |
| TCP | Transmission Control Protocol of Internet protocol suite |
| UDP | User Datagram Protocol of Internet protocol suite |
| QoS | Quality of service is an ability to provide different priorities to different applications, users, or data flows, or to guarantee a certain level of performance to a data flow |
| TX | Data being transmitted |
| RX | Data being received |
| time-critical | A data which become useless in period of time after existence. |

SUMMARY

The present invention seeks to provide an improved data communication system for providing enhanced quality-of-service for low-end client devices as well as high-end client devices, in respect of data processing capability, for example in an audio and video conferencing arrangement.

The present invention also seeks to provide an improved method of communicating data in a data communication system for providing enhanced quality-of-service for low-end client devices as well as high-end client devices, in respect of data processing capability, for example in an audio and video conferencing arrangement, but not limited thereto.

According to a first aspect, there is provided a data communication system including a plurality of communication devices coupled to each other via a communication network. The plurality of communication devices are operable to exchange data therebetween, wherein the system is operable to allocate the data into a primary type of data and at least a secondary type of data. The primary type of data is communicated substantially immediately within the system, and at least the secondary type of data is communicated in the system in association with corresponding acknowledgements (ACK) being communicated in the system in response to receipt and processing of the at least secondary type of data at one or more of the plurality of communication devices.

The invention is of advantage in that it is capable of providing an improved quality-of-service to the client devices, for example when the client devices and their associated communication links to the data server arrangement are of mutually different data communication performance.

It will be appreciated that the centralized server can be used for communicating data, or data can be communicated in a peer-to-peer manner. The communication can be between clients or between server and client, for example when playback is used.

It is possible that another server can exchange data between a client device and the centralized server as a router, if a direct client connection to the centralized server is slower than the connection between client to a route server and the centralized server. The route server can exists in any location or network, which has better response time than centralized server for the client, and it can also control the data flow of different data types. When there are many clients in the communication, the centralized server is typically then needed or some client should then operate as the centralized server. If the communication is only between two devices, peer-to-peer communication is also optionally employed. Peer-to-peer communication can also be used with multipoint communication, for example peer-to-peer rings, wherein the clients are mutually connected by using structured overlay network using ring topology. This kind of peer-to-peer communication can sometimes start with the centralized server, but there is no active need to use a centralized server during the communication. The clients can execute acknowledgements by themselves and make change requests by themselves, when they notice that there is need to change some properties, for example resolution, frame-rate, audio quality, and so forth. In multipart communication, there is often a benefit in using a centralized server, because the centralized server can do all needed controls and adjustments, but it is not mandatory.

Optionally, in the data communication system, the primary type of data includes audio data, and the secondary type of data includes image and/or video data and/or any other data.

Optionally, the data communication system can be a video conferencing service, a video broadcasting service (such as Youtube, Netflix, Viaplay and similar), a teleconference service, a multiuser game service, a video-on-demand service and so forth.

Optionally, the data communication system is operable to determine communication characteristics of the communication network arrangement and/or of one or more of the client devices, and to adjust one or more rates of data packet communication to the one or more client devices as a function of the determined communication characteristics. Beneficially, a client measures the remote end network and CPU congestion by the interval of the ACKs received. Moreover, a client measures the local computational effort by receiving buffer buildup, CPU load and/or video/audio rendering interval. Furthermore, a client adjusts the outbound data quantity and local use of CPU resources by quality and/or frame rate. The system is able, because of the significant acknowledgements of the second or later priority data, to adapt itself constantly for fluctuating sub-network speeds and heavy processing loads. That is, not even an attempt is made to code a new burst of video stream until the receiver has acknowledged the correct decoding of the previous, or the one before the previous burst of video stream.

Namely, in general the fastest operation is achieved by having one extra buffer so that the new frame is transmitted always when the next to the previous frame has been acknowledged. Using this extra buffer makes it possible to always have one frame under process (or completed for the next stage), in all phases of the entire process chain, namely in the encoding stage, in the transmission stage, in the reception stage and in the decoding stage. In the setup using an extra buffer, the encoder transmits the first two frames fast, and then waits for the acknowledgement of the first frame before transmitting the third frame and so forth. Such a setup increases the frame rate nicely, yet does not block the system, or cause large delays. That is, the encoder does not need to wait for the acknowledgement by the decoder for the first frame before encoding and delivering the second frame. The acknowledgement by the decoder for the first frame is however needed before the encoder will encode and deliver the third frame, et cetera. The 'extra buffer' mentioned here can reside in the decoder, in the encoder or possibly in a proxy server.

Optionally, in respect of determined communication characteristics, an adjustment is implemented by a client measuring a remote end network and CPU congestion by a temporal interval for acknowledgements (ACKs) to be received and/or by a client measuring a local computational effort expended in respect of a receiving buffer buildup, CPU load and/or video/audio rendering interval and/or by a client adjusting an outbound data quantity and local use of CPU resources by quality and/or frame rate.

Optionally, the data communication system is operable to determine communication characteristics of the communication network arrangement and/or of one or more of the plurality of communication devices, and to adjust one or more rates of data packet communication to the one or more of the plurality of communication devices as a function of the determined communication characteristics.

Optionally, the data communication system is operable to determine communication characteristics of the communication network arrangement and/or of one or more of the plurality of communication devices, and to adjust a maximum segment size (MSS) of data packet communication to the one or more of the plurality of communication devices as a function of the determined communication characteristics.

Optionally, in the data communication system, at least one of the plurality of communication devices is at least one of a wireless-enabled mobile communication device and a wirelessly-connected personal computer (PC).

Optionally, the data communication system is operable to communicate at least tertiary data in a non-time-critical manner between the plurality of communication devices, wherein the at least tertiary data corresponds to at least one of documents, measurement data.

Optionally, the data communication system is operable to communicate in a manner such that the primary type of data communicated to a first communication device functioning as a server is substantially immediately retransmitted therefrom to one or more second communication devices among the plurality of communication devices.

Optionally, the data communication system is operable to communicate the primary type of data as a highest priority followed by the secondary data as a lower priority.

Optionally, the data communication system is operable on a momentary basis to prioritize the secondary or the tertiary type of data over the primary type of data when communicating to the plurality of communication devices. Optionally, in the data communication system, the communication network arrangement is implemented, at least in part, as a peer-to-peer communication network.

Optionally, in the data communication system, the plurality of communication devices are further operable to communicate with each other using a peer-to-peer mode within the peer-to-peer communication network.

Optionally, the data communication system includes a centralized server coupled to the communication network.

Optionally, in the data communication system, the primary type of data and the secondary type of data are not communicated to the centralized server when two or more communication devices communicate in the peer-to-peer mode.

Optionally, in the data communication system, the two or more communication devices operate in the peer-to-peer mode when the primary type of data and the secondary type of data are used only by a single user.

Optionally, in the data communication system, a peer-to-peer connection between two or more communication devices is constructed using a TCP/IP protocol stack, using at least one of a UPnP technology and a TCP Hole Punching technique.

Optionally, in the data communication system, the communication network arrangement is implemented, at least in part, via the Internet implementing TCP/IP, or UDP/IP.

Optionally, in the data communication system, the centralized server inspects one or more capabilities of one or more of the communication devices and selects at least one communication device to function as a server for other communication devices.

Optionally, in the data communication system, the centralized server arrangement is operable to host a service or services, wherein the one or more services includes a virtual room, a multipoint server and/or a multiplayer server, such that the system is operable to provide at least one of: a video conferencing service, a video broadcasting service, a teleconference service, a multiuser game service, and a video-on-demand service to parties using at least one of the plurality of communication devices.

Optionally, a control command is determined to have a higher priority than one of audio data and video data.

Optionally, the control command is determined to be the primary type of data and one of audio data and video data is determined to be the secondary type of data.

According to a second aspect, there is provided a method of communicating data in a data communication system including a plurality of communication devices coupled via a communication network. The method includes:

(a) operating the plurality of communication devices to exchange data therebetween, wherein the system is operable to allocate the data into a primary type of data and at least a secondary type of data; and (b) communicating the primary type of data substantially immediately within the system, and communicating at least the secondary type of data in the system in association with corresponding acknowledgements (ACK) being communicated in the system in response to receipt and processing of the at least secondary type of data at one or more of the plurality of communication devices.

Optionally, the method includes arranging for the primary type of data to include audio data, and for the secondary type of data to include image and/or video data and/or any other data.

Optionally, the method is used in data communication systems such as video conferencing services, video broadcasting services (Youtube, Netflix, Viaplay and similar), teleconference services, multiuser game services, video-on-demand services.

Optionally, the method includes operating the system to determine communication characteristics of the communication network arrangement and/or of one or more of the plurality of communication devices, and to adjust one or more rates of data packet communication to the one or more of the plurality of communication devices as a function of the determined communication characteristics.

Optionally, the method includes operating the system to determine communication characteristics of the communication network arrangement and/or of one or more of the plurality of communication devices, and to adjust a maximum segment size (MSS) of data packet communication to the one or more of the plurality of communication devices as a function of the determined communication characteristics.

Optionally, the method includes enabling at least one of the one or more communication devices being at least one of a wireless-enabled mobile communication device and a wirelessly-connected personal computer (PC).

Optionally, the method includes operating the system to communicate at least tertiary data in a non-time-critical manner between the plurality of communication devices, wherein the at least tertiary data corresponds to at least one of: documents, measurement data.

Optionally, the method includes operating the system to communicate in a manner such that the primary type of data communicated to a first communication device among the plurality of communication devices is substantially immediately retransmitted therefrom to one or more second communication devices among the plurality of communication devices.

Optionally, the method includes operating the system to communicate the primary type of data as a highest priority followed by the secondary data as a lower priority.

Optionally, the method includes operating the system on a momentary basis to prioritize the secondary or the tertiary type of data over the primary type of data when communicating to the communication devices.

Optionally, the method includes implementing the communication network arrangement, at least in part, as a peer-to-peer communication network.

Optionally, the method further includes the operating the system enabling the plurality of communication devices to communicate with each other in a peer-to-peer mode within the peer-to-peer communication network.

Optionally, the method further includes operating the system in such a manner that the primary type of data and the secondary type of data are not communicated to a centralized server when two or more communication devices communicate in the peer-to-peer mode.

Optionally, the method further includes operating the system in such a manner that the two or more communication devices communicate in the peer-to-peer mode when the primary type of data and the secondary type of data are used only by a single user.

Optionally, the method further includes constructing a peer-to-peer connection between communication devices using a TCP/IP protocol stack, using at least one of a UPnP technology and a TCP Hole Punching technique.

Optionally, the data communication system further includes a centralized server coupled to the plurality of communication devices via the communication network arrangement, and the method further includes inspecting, by the centralized server, one or more capabilities of one or more of the communication devices and selecting, by the centralized server, at least one communication device to function as a server for other communication devices.

Optionally, the method includes implementing the communication network arrangement, at least in part, via the Internet implementing TCP/IP or UDP/IP.

Optionally, the method includes operating the data server arrangement to host one or more services, wherein the one or more services comprises a virtual room, a multipoint server and/or a multiplayer server, such that the system is operable to provide at least one of a video conferencing service, a video broadcasting service, a teleconference service, a multi-user game service, and a video-on-demand service to parties using the at least one of the plurality of communication devices.

According to a third aspect, there is provided a computer program product including a non-transitory computer readable storage medium having computer readable instructions stored thereon. The computer readable instructions are executable by a computerized device including a processor to implement the method pursuant to the second aspect.

Optionally, the method includes determining a control command to have a higher priority than one of audio data and video data.

Optionally, the method includes determining the control command to be the primary type of data and determining one of audio data and video data to be the secondary type of data.

It will be appreciated that features of the invention are susceptible to being combined in various combinations without departing from the scope of the invention as defined by the appended claims.

BRIEF DESCRIPTION OF THE DRAWINGS

Embodiments of the present invention will now be described, by way of example only, with reference to the following drawings wherein.

Figure 1:
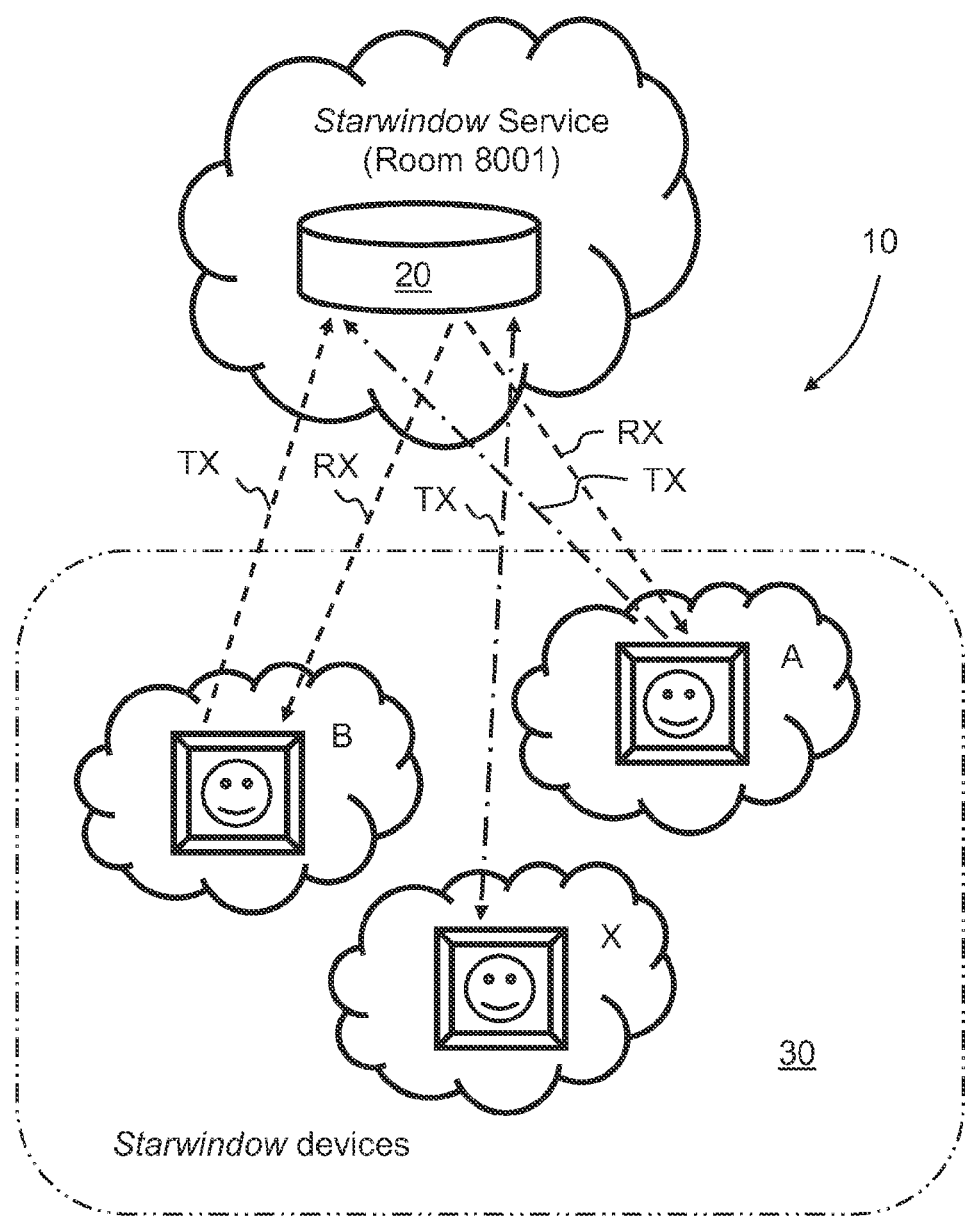
FIG. 1 is an illustration of a data communication system, known as a "Starwindow® Service", employing a centralized configuration of data server for serving a plurality of mutually different client devices A, B, X; "Starwindow" is a registered trademark of Gurulogic Microsystems Oy.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

In overview, in this disclosure, there is described a data communication system which is operable to address quality-of-service (QoS) for low-end clients as well as high-end clients to a same real-time communication session without congesting a low-end communication network whilst not blocking a low-end CPU with too much data in too short a time. The data communication system addresses the aforesaid quality-of-service (QoS) by dividing data to be transmitted in the data communication system into a plurality of types of data, for example primary and secondary types of data, and by managing delivery of such types of data to clients in a centralized manner, for example by employing a primary method and a secondary method. Beneficially, there is employed optimized network usage, wherein Relative Packet Rates are selected appropriately, and a tailor-made acknowledgement scheme is employed in the data communication system. Embodiments described herein are devised, for example, in relation to providing a video conference solution, namely for ensuring a quality-of-service (QoS) for all sorts of client devices and network types. For example, such a video conferencing solution is susceptible to being implemented via data communication networks, for example the Internet but not limited thereto, wherein regions of the communication networks can mutually differently vary in communication performance, and devices coupled together via such data communication networks for providing the video conferencing solution can mutually vary in respect of their capability of processing data received thereat.

The video conferencing solution is beneficially implemented pursuant to a Starwindow concept, wherein two or more parties are communicatively mutually coupled together via a virtual room that is situated at a service provider's server; all information passing through the server is transmitted to all the parties coupled to the server. However, it will be appreciated that, sometimes, clients can also operate as server or server nodes and then the real centralized server is not always needed. In playback, it is feasible that there is only one client and server that holds and delivers information. Sometimes, the playback service is operating similarly as one sending client and it can create its own real time issues similarly as client. This means that there can arise a need to adjust an amount of data delivery, in client or in server, based on properties of receiving clients; for example, such a situation arises when there are multiple clients receiving the playback simultaneously, when they are to discuss the playback. A recording service can also sometimes be understood as a receiving client. Ideally, the recording service stores the delivered information using the quality that it receives; sometimes transcoding might be needed, because some clients might have a slower network or terminal device than others. In such a case, the delivered information might be recoded with lower quality to achieve better compression ratio, or optionally transcoded with another codec, if the client device/application is not compatible with the codec used in the delivered data, or if the optional codec would yield other benefits (e.g. encoding support, encoding speed enhancement, savings on memory usage, processing load and time and/or energy consumption during encoding, decoding support, decoding speed enhancement, savings on memory, processing load and time and/or energy consumption during decoding, reduced amount of encoded data, increased quality of decoded data).

The recoded/transcoded content coded with lower quality will have a smaller data size and consequently needs less bandwidth to transmit and less storage space on hard drives. However, the recoding/transcoding process consumes processing time and energy at the server, and a lower quality cannot be used if lossless quality is required, so the cost-benefit ratio must be computed in each case individually.

The aforesaid Starwindow concept is capable of addressing a problem which is encountered in practice arising from differences in communication network speed and also a problem arising from differences in processing power of client devices of the parties, as well as a problem arising mutually different network infrastructures through which the client devices of the parties are communicatively coupled to the server.

Embodiments, as will be herewith described, are beneficially implemented via the Internet, but optionally employ wireless communication networks as well as optical fibre and wire connection networks. When the contemporary Internet is employed, the Internet beneficially employs Hypertext Transfer Protocol (HTTP). The Protocol is an application protocol for distributed, collaborative hypermedia information systems. In implementation, HTTP is a multi-linear set of objects which are operable to build a network using logical links to define the network; the links are often referred to as being "hyperlinks" which define a network relationship between nodes.

HTTP is designed to permit immediate network elements to enable communications between client devices and servers. High-traffic web-sites of the Internet often employ web cache servers that are operable to deliver content on behalf of upstream servers to improve response times for data and/or service delivery. Moreover, HTTP proxy servers at private network boundaries are beneficially used to facilitate communication for clients without a globally routable Internet address, namely by relaying messages via external servers.

HTTP resources are identified and located on a given network by using Uniform Resource Identifiers (URI's), also referred to as Uniform Resource Locators (URL's). Moreover, URI's and hyperlinks are expressed in Hypertext Markup Language (HTML) which are capable of forming webs of mutually interlinked hypertext documents.

HTTP defines a method, conveniently referred to as "verbs", for indicating a desired action to be performed in respect of an identified resource. The resource is, for example, a data file or an output from an executable object residing on one or more servers. Examples of HTTP "verbs" are provided in Table 2.

TABLE 2

| "Verb" | Details |
| --- | --- |
| GET | Requests a representation of a specified resource, wherein requests using "GET" should only retrieve data |
| HEAD | Requests a response which is identical to that obtainable from GET, but devoid of any response body; "HEAD" is often employed for retrieving meta-data in an efficient manner |
| POST | Requests that a given server accepts an entity enclosed in the request as a new sub-ordinate of a given web resource identified by a URL |
| PUT | Requests that an enclosed entity be stored in respect of a supplied URI (URL). If the URI refers to an already existing resource, that resource is modified. |
| DELETE | Requests deletion of a specified resource |
| TRACE | Results in a received request to be echoed back to the given client |
| OPTIONS | Returns HTTP methods supported by a server associated with a given URL |
| CONNECT | Converts a requested connection to a transparent TCP/IP tunnel, for example for facilitating SSL-encrypted communication (HTTPs) through an unencrypted HTTP proxy as aforementioned |
| PATCH | Requests application of partial modifications to a given resource |

In embodiments described in this disclosure, there are employed a plurality of methods, for example primary and secondary methods, for processing data at a centralized server communicatively coupled to a plurality of client devices of parties; the centralized server is beneficially coupled in a Starwindow or similar service configuration. For example, in the primary method, the client devices of the parties are connected via a same predetermined TCP/UDP port at the centralized server; such a manner of connection creates a connection session for all the parties involved. Beneficially, this session lasts for as long as a given party is communicatively connected with the aforesaid virtual room. Moreover, it will be appreciated that User Datagram Protocol (UDP) is connectionless, such that a given communication session is controlled at a software application level when User Datagram Protocol (UDP) is employed.

Software applications, executing upon computing hardware for implementing embodiments of the disclosure, employ the aforesaid plurality of methods, for example primary and secondary methods, for mutually communicating by transmitting primary data and secondary data. The primary data includes, for example, audio data that is time-critical. Moreover, the secondary data includes, for example, video data which is often less time-critical or non-time-critical.

In operation of the aforesaid Starwindow or similar service configuration, primary data including audio data is transmitted to a centralized server that substantially immediately retransmits the primary data to client devices of designated parties to a given session, independently of communication or command protocol employed; thus, the primary data as time-critical audio data is never acknowledged in the Starwindow or similar service and a given recipient client device is never made to wait to receive the retransmitted primary data, and the secondary data as less time-critical video data is transmitted via the Starwindow or similar service without blocking or flooding network connections or any CPU of recipient devices of the parties to the session, because it is controlled by acknowledgements. Beneficially, the acknowledgements can delay sending/transmission of the next packet, and from the delay there can be deduced how well the data has been communicated and/or how much time it takes to process the data in order to make a decision as to whether or not the amount of data should be decreased, for example by lowering the quality or reducing the size of the image. With the help of acknowledgements, both data transmission and data processing can be monitored, and based on these observations, image quality or size (which also often influences the quality) can be altered.

The aforesaid secondary data is transmitted by a given client device of a party to the session to be received at the centralized server; the centralized server retransmits to other parties of the given session which send acknowledgements to confirm receipt and processing of the retransmitted secondary data. By controlling such flow of the secondary data, the Starwindow or similar service is capable of avoiding congesting low-end networks, which may have limited data bandwidth, and blocking low-end CPU's with too much data in too short a time. In contradistinction, many known contemporary protocols intended for real-time communication often work only in session between two mutual participants; when more participants join a given session, data processing required becomes too demanding for the participants regarding CPU's of their client devices as well as for network infrastructures conveying data flows associated with the given session. Embodiments as herewith described in this disclosure, for example implemented as a Starwindow service, avoid causing excess demands on CPU's of client devices by controlling data to be retransmitted in such a way that client devices of parties which have weaker capacity to process data received thereat remain in session.

In an example where control commands enable a real-time functionality of a software program of the data communication system, the control commands are considered more important than audio data and, therefore, are given a relatively higher priority. In another example, audio data for a teleconference is given a higher priority over video data, as a time-to-live of the audio data is only a few tenths of a second. A high prioritization of the audio data is desirable to reduce delays that could otherwise render the audio unintelligible, for example, when undertaken as an oral dialogue. In yet another example, in a real-time control system, real-time sensor data is given a higher priority over archive data. In still another example, test data that is of more interest to a given receiver is given a higher priority over extraneous advertisement content.

Optionally, when assigning the prioritization codes, a lowest prioritization code is assigned to a type of data that has a highest priority. In this regard, the prioritization codes can be implemented, for example, as defined in an example table below.

| Prioritization code | Information type |
| --- | --- |
| 0x00 | Reserved 0 |
| 0x01 | Control command |
| 0x02 | Broadcast message |
| 0x04 | Audio data |
| 0x08 | Video data |
| 0x10 | Reserved 5 |
| 0x20 | Text data |
| 0x40 | File data |
| 0x80 | Playback data |

In the example table above, control commands are more important than broadcast messages, which are more important than audio data, which is more important than video data. This implies that even when there would be video data available to be transmitted, control commands, broadcast messages and audio data will be transmitted before the video data.

It should be appreciated that the table above, containing prioritization codes, is only one example of embodiments of the disclosure and should not be considered in any way as limiting the priorities to only the order described in the example table.

Embodiments of the disclosure will now be described with reference to FIG. 1. A data communication system is indicated generally by 10. The system 10 includes a server 20, for example implemented as a Starwindow Service, provided with an identification "Room 8001". Client devices 30 compatible with the server 20, for example Starwindow-compatible client devices, include client devices A, B and X; these client devices 30 are able to connect to a predetermined virtual room, for example the aforementioned "Room 8001" implemented via a TCP port 8001 of the server 20. Optionally, connections to the predetermined virtual room are implemented as connectionless User Datagram Protocol (UDP) sessions, wherein identification and addressing are port independent; for example, identification and addressing are optionally implemented at a socket level or by another form of arbitration, for example by use of an application level command. Beneficially, this virtual room exists permanently, or it is a creation of a given communication session using the system 10. The virtual room creates an environment for a plurality of parties to communicate mutually, wherein the Starwindow Service or similar is operable to transmit audio-visual data of all mutually connected parties of the session in a controlled manner.

The system 10 of FIG. 1 is operable to transmit data to the client devices 30, taking into account their CPU performances for processing data, and also their associated communication network infrastructures and their associated performance characteristics, for example data communication capacity and/or latency performance. Optionally, the system 10 employs several network protocols and audio-visual (AV) codecs. However, an important feature of operation of the system 10 is that the server 20 manages in a centralized manner primary and secondary data flows between the server 20 and the client devices 30, while taking into account data processing resources available at the client devices 30. In FIG. 1, "TX" denotes data being transmitted, and "RX" denotes data being received, from a point of view of client devices 30. The client devices 30 create at least two connections, or one two-dimensional RX/TX-connection as shown for X-client, to the server 20, namely the Starwindow service or similar, namely at least one connection for receiving data and at least one connection for transmitting data. Optionally, it is feasible to employ separate connections for video information and audio information.

The system 10 of FIG. 1 is operable to transmit data through one or more route servers. Usually, the route server exists in a backbone network, but it may optionally exist in any network. Moreover, a client may operate as a route server. Normally, the route server network capacity is greater than the network to which a client is connected. Thus, it is possible that another server can exchange data between a given client device and a centralized server as a router if direct client connection to centralized server is slower than the connection between the client to a route server and the centralized server. Therefore, if a route server is used, then it usually exists in better geolocation than centralized server for the client network. The route server optionally also controls the data flow of different data types, as in the aforesaid described method of QoS. The acknowledgements related to secondary data take care of the network capacity variation with or without router servers. The speed is always limited by the slowest part of the network, and therefore it is usually not so crucial regarding whether or not the route server used for the network is faster or slower in different sides of the route server. If the route server has capacity to adjust the data, then it can also optionally execute data adjustments.

It is beneficial to utilize a communication network for coupling the client devices 30 to the server 20, wherein the system 10 is operable to utilize the communication network in an optimal manner. In operation, the server 20 requests a Maximum Transmission Unit (MTU) value from each of the client devices 30 in order to determine a maximum data packet size that the client devices 30 are each able to handle, for example to process in their CPU's. Optionally, for increasing a speed of transmission within the system 10, communication networks of the system 10 employ User Datagram Protocol (UDP) peer-to-peer and optimized packet headers, for example for enabling peer-to-peer communication to occur directly between the client devices 30, for example without a need for acknowledgements for every data packet that the Transmission Control Protocol (TCP) requires.

Namely, when no benefits can be gained by transmitting the data in a centralized way, for example because there are no multiple users for the same data or transcoding is not needed, then it is beneficial to transmit the data directly between the client devices, without circulating it via a centralized server. Furthermore, the peer-to-peer mode enables a local group to communicate directly inside a network, without a need to send data back and forth to a server which is possibly situated at a remote location. It should be appreciated that sometimes a client is capable of acting as a server. However, the ultimate control should be kept with the centralized server.

The primary embodiment pursuant to the disclosure is via a centralized server:

<client> - - - <server> - - - <client>

However, the centralized server setup is often not optimal, and if possible, a peer-to-peer connection is constructed using the TCP/IP protocol stack, primarily using the UPnP technology and secondarily TCP Hole Punching technique, in which cases the centralized server is bypassed as follows:

<client> - - - <client> in such a way that one of the clients is made to act as a server for other clients:

<client> - - - <client+server

Here, the concept 'client+server' is simply a client which acts as a server, i.e. its connection port is set to listen mode when the protocol in use is TCP over IP. Prior to engaging in peer-to-peer communication, the centralized server inspects the capabilities of the clients for selecting suitable candidates for the <client+server> role. It is to be noted that even here the role set for a client depends on the application that implements the invented method, e.g. the host of a Starwindow 'room' acts as a 'client+server'.

It will be appreciated that for the embodiments pursuant to the disclosure use of TCP/IP is optional. Optionally, alternatively, UDP protocol can be used. TCP/IP is ideal for the acknowledgements but such a functionality can be simulated also when UDP is used.

Summarizing the foregoing, the system 10 handles data via the server 20 as at least primary and secondary types of data. Moreover, a communication network employed to couple the client devices 30 to the server 20 is optimized, and acknowledgements are handled in the system 10 is a customized manner. Thus, the system pursuant to the disclosure is not dependent on the regular acknowledgements of the protocol used, but instead, acknowledgements are generated as desired. Such features will be further elucidated in embodiments which will be described next.

Data packets communicated within the system 10 result in data flowing via the server 20, wherein the flow of data is controlled by way of primary and secondary types of data being handled. Thus, in practical communication within the system 10, at least two types of data are distinguished and processed. Beneficially, the primary type of data is often time-critical audio data which becomes outdated and must be communicated promptly before it becomes obsolete, especially when real-time communication applications are being executed within the system 10. For example, it is found in practice that delaying last two words of a sentence by merely two seconds often renders the sentence intelligible, namely too late for comprehension to be achieved.

The secondary type of data, communicated within the system 10, is not as time-critical as the aforesaid primary type of data, but nevertheless is beneficially transmitted, when possible, within the system 10 with a delay which does not adversely influence its intelligibility. The server 20 provides its service, for example Starwindow service, by controlling communication concerning transmission of the primary and secondary types of data, wherein the primary type of data for each client device 30 is transmitted via the server 20 without delay, or with minimal delay, such that the primary type of data is transmitted before the secondary type of data, even though the secondary type data, in an absence of such prioritization of the primary type of data, would have arrived earlier. It will be appreciated that it is possible for some part of the received secondary data never to be transmitted from server to one or more clients, for example, in a situation where a new image frame has arrived and the old image frame has not started to transmit yet to some clients. If a codec employed is able to skip the older frame, then it will be skipped to those one or more clients. The primary type of data, for example audio data, does not cause a deviating workload to the communication network or CPU of the client devices 30, because the system 10 is operable such that primary type of data is not processed if it has become temporally obsolete, or obsolete for any other reason. Conversely, the secondary type of data is processed in a substantially similar manner to the primary type of data, except that the new secondary type of data is not transmitted within the system 10, unless the old secondary data has been received and processed by one or more of the client devices 30 and one or more corresponding acknowledgements (ACK) have been sent by the one or more client devices 30 back to the server 20. The acknowledgement (ACK) sent by one or more of the client devices 30 in response to receipt and processing of the secondary type of data thereat is technically beneficially executed using an ACK message pertaining to TCP/IP protocols, for example as defined in RFC 793 "Transmission Control Protocol", URL: http://tools.ietf.org/html/rfc793 hereby incorporated by reference, in RFC791, URL: http://datatracker.ietf.org/doc/rfc791/ hereby incorporated by reference, and in "Internet Protocol", URL: http://en.wikipedia.org/wiki/Internet_Protocol hereby incorporated by reference. This ACK message is beneficially transmitted in the header of TCP data packets; thus, the ACK message is beneficially communicated in such headers, because acknowledging received data packets is beneficially executed by a network card (NIC) of the one or more client devices 30 at hardware level, thereby avoiding a need to employ main CPU resources of the one or more client devices 30 for such acknowledgement purpose. There is optionally employed one or more alternative acknowledgement techniques without utilizing aforesaid ACK acknowledgement of a received TCP data packet, for example using a customized acknowledgement arrangement.

As regards handling acknowledgements in customized manner for secondary data, especially in the case where the UDP protocol is utilized, alternative ways of performing acknowledgements can be applied. For example, although the UDP protocol by default does not use acknowledgements, depending on the properties of current data in the stream, customized acknowledgements could be sent e.g. for each packet, or for every fifth packet, or a few times for each image, or for each image, or for every fifth image etc.

Congestion management of acknowledgement (ACK) messages from the one or more client devices 30 is implemented in the server 20, and optionally also at the one or more client devices 30. Moreover, the management is beneficially implemented in separate data packets communicated within the system 10. Such congestion management enables the system 10 to control CPU and network resources on a per client device 30 basis.

With reference to functionality of service provided within the system 10, it is beneficial that an acknowledgement of received secondary type of data be transmitted from a recipient as soon as a corresponding secondary data packet has been received and processed, because such prompt acknowledgement enables the communication network employed, and CPU load, to be most effectively managed.

The system 10 is thus capable of delivering a communication service, for example the aforementioned Starwindow service, which is operable to prevent the client devices 30 from congesting the communication network and from transmitting too much secondary type of data that would potentially congest the communication network serving weaker, less resourceful client devices 30, for example whose reception speed might be permanently weaker. Moreover, the system 10 is capable of coping with varying data communication capacity of the communication network, for example arising from changing operating characteristics of Universal Serial Bus (USB) modems or USB network sticks, for example via wireless communication links. Furthermore, the system 10 is also beneficially managed to save transmission time for primary type of data, wherein primary data packets are beneficially always transmitted before secondary data packets. If there is space in the data packet that contains primary data, then that space is beneficially optionally also filled by secondary data; by employing such efficient use of packet data carrying capacity, a new primary data packet can be delivered immediately after this packet, but acknowledgement of that packet has to be received before the new secondary data packet can be transmitted.

In an example embodiment of the system 10, a primary audio data packet is beneficially played back in real-time. Conversely, video data, which is usually ten times more voluminous and comprising several data packets, results in considerably more CPU load and thus causes an immediate lengthening of response time, also for the primary data packets, for example audio data. For this reason, as aforementioned, the secondary data packets are acknowledged by using an acknowledgement scheme, for example as described in the foregoing in respect of the Starwindow service.

In the service provided by the system 10, for example the Starwindow service, several of the client devices 30 are equipped with low-end CPU's, but nevertheless are provided with a fast enough network connection to the server 20 and have joined a Starwindow virtual room, wherein the secondary image data is discarded and acknowledged as processed already at reception of the secondary data, in which case the CPU load is saved for processing primary data received at the client devices 30 with low-end CPU's. Moreover, the service is also capable of lessening the CPU load or save communication network capacity of the client devices 30 with low-end CPU's, namely weaker client devices 30, by temporally delaying the acknowledgements of relatively faster client devices 30, in which case the system 10 is operable to decrease an image frequency as provided in the secondary data. Furthermore, the system 10 is optionally operable, by controlling the server 20, to define a video resolution of the virtual room hosted by the server 20, in which case the client devices 30 transmit a smaller image, for example lower-resolution image or a more specific image (for example, just participant faces without background boarder), which results in a decrease in CPU load of weaker client devices 30 and corresponding associated communication network load. Optionally, the system 10 is operable to transcode the audio information of the primary type of data, and/or to decrease image update frequency and/or image resolution. Such adjustment in operation of the system 10 enables the weaker client devices 30 to cope with both primary and secondary types of data flow within the system 10.

Beneficially, the client devices 30 receive and send information within the system 10 at a highest feasible resolution and quality, within limits of CPU and communication network resources to provide an optimal information transfer experience for parties using the client devices 30. The client devices 30 optionally include one or more of: smart phones, tablet computers, phablet computers, lap-top computers, personal computers (PC's), personal data assistants (PDA's), wireless-enabled wrist-worn computers, but not limited thereto.

A most efficient manner, in the system 10, of decreasing the CPU load of the weaker client devices 30 is achieved by decreasing their own audio and image encoding, for example by lowering quality, by lowering frame rate or by moving computational load to server by using less space-efficient encoding and allowing the server to compress the data more. Such an approach for assisting the weaker client devices 30 has a much bigger effect than decreasing decoding of the received data at weaker client devices 30; such adjustment is achievable in the system 10 on account of its ability to inspect speeds of data transmission to and/or from the client devices 30 in a centralized manner, both by using the aforesaid acknowledgement scheme and altering characteristics of requested and transmitted data.

In an event that the system 10 is instructed to communicate other types of data between the client devices 30, for example files that do not have any real-time effects such as documents, measurement result data, the other types of data is beneficially communicated within the system 10 as a tertiary type of data having a priority lower than that of the primary and secondary types of data. Thus, within the system 10, there are beneficially more than two prioritization levels employed in operation for data types communicated therethrough. However, such prioritization is beneficially implemented in the system 10 in a manner which is dynamically variable, such that on occasional moments, the prioritization is changed, for example document data is, for a fewer seconds, prioritized higher than audio and/or video data, whilst the document data is being distributed to the client devices 30, for example during negotiations undertaken between the parties using the client devices 30. Playback data can be understood as data that does not have real-time effects, or as data that contains primary and secondary data. Sometimes, when there are multiple parties that want simultaneously to watch the playback and discuss the playback, the playback can have the highest priority and the primary data and secondary data of the normal communication has lower priority than the playback. When one user is alone without other persons watching playback, then there can be only one receiving client and one client or server delivering the playback. In such a situation, the playback data contains typically primary and secondary data and these data are handled similarly as the data that is coming from other clients is coupled in communication. When a given recording has been made, the recording device, for example some client in the communication, a separate receiving client, a server node, a router server or server, can have bandwidth and processing resource restrictions. The recording device should affect the incoming data similarly as the request related to normal receiving clients using primary and secondary data and needed quality adjustments that may depend on bandwidth or processing capacity.

In the system 10, it is most normal in operation that audio data is given a highest priority, as described in the foregoing, and video data is given a secondary priority, and other types of data given a tertiary or lower priority. Beneficially, there is employed in the system 10 percentage goals for shares of transmission of different data types, optionally such that long delays associated with data transmission within the system 10 are prevented. In an event that the server 20, for example, identifies that audio data is taking all available bandwidth of communication links to one or more of the client devices 30, the server 20 is operable to instruct a lower quality of audio transmission with associated lower data flow rates, for example reducing from 16-bit audio resolution to 10-bit audio resolution, or even 8-bit audio resolution in combination with audio dynamic range compression.

The system 10 is beneficially operable to apply a network optimization to the communication network coupling the client devices 30 in communication with the server 20. Such network optimization is, for example, implemented by requesting a Maximum Transfer Unit (MTU) value from networks coupling the connected client devices 30 to the server 20. It is thereby feasible to identify a weakest communication link in the communication network, and thereafter setting the Maximum Segment Size (MSS) for transmissions to a client device 30 associated with the weakest link at a rate which can be accommodated by the weakest link. This MSS value is optionally communicated by the server 20 to other client devices 30 of the system 10. Such network optimization is beneficially implemented using a method having following steps:

Step 1: the system 10 determines a weakest data link coupling the server 20 to the client devices 30; for example, the MTU value for a given data link is 1500 Bytes. When this MTU value is subtracted by the number of TCP header Bytes, namely 40 Bytes, 1460 Bytes are available. These 1460 Bytes correspond to the MSS.

Step 2: the system 10 determines a MSS for a given session by employing the MSS of the weakest identified link.

Step 3: optionally, a Nagle algorithm employed in the system 10 is disabled in order to prevent congestion control within the system 10, namely achieved by setting the TCP_NODELAY option on a socket of the system 10, which disables the Nagle algorithm. Such disablement of the Nagle algorithm is desirable, because the Nagle algorithm waits before a certain amount of Bytes of data have been added to a transmission queue before a corresponding data packet is sent. When the Nagle algorithm is disabled, the system 10 is capable of sending a data packet of size determined solely by the system 10 as aforementioned.

A packet rate of full duplex, namely two-way communication, is an amount of packets communicated in a unit time. Moreover, the packet rate depends upon a protocol used for data communication within the system 10; when acknowledgements are necessary, an achievable packet rate in the system 10 decreases, because a transmitter of the system 10 has to retransmit a data packet if a corresponding acknowledgement is not received at the transmitter. A video signal frame includes one image, and corresponding data usually requires several network data packets to be sent. Moreover, an audio frame includes a designated amount of consecutive audio samples. For both video and audio data, both kinds of frame will have header Bytes in addition to its corresponding data.

If there is included quantity information and/or property information in an optional header section, for example indicative of time that the packets require to be communicated, indicative of the image area, or some other quantity, it is feasible to compute a consumption capability of a given client device 30 for such information. This consumption or absorption capability can be delivered with a remainder of the data, in which case each client device 30 and the server 20 are able to adjust a data transmission speed employed for this particular quantity or property. It is thereby feasible to balance between information types communicated within the system 10 by way of property flexibility, for example as a function of urgency and/or on a basis of resource requirements. A factor to be adjusted is, for example a relative packet rate information type and/or urgency type. The factor is capable of being used to balance information delivery within the system 10 on a per-client-device 30 basis, so that each client device 30 will receive a best possible experience when the system 10 is in operation.

In other words, it is feasible in the system 10 always to balance both the transmission and reception of data packets. Often, both the transmission and the reception of data packets are important, and operation of the whole system 10 is controlled accordingly in an optimized manner. However, occasionally, the transmission of data packets to one given client device 30 is more important than data packet transmission to another client device 30 of the system 10. Moreover, the data communication rate when transmitting data packets can be very different from the data communication rate when receiving data packets, and such difference is taken into account when optimizing operation of the system 10.

When communicating data in the system 10, it is desirable that the data packet size is set to MSS (MTU-header) that is determined as described in the foregoing. Optionally, the relative packet rate information includes an Optional/Data section of the header. Moreover, communication delays occurring within the system 10 when in operation are beneficially computed by measuring differences and changes of achieved relative packet communication rates. Beneficially, each client device 30 computes the delay of recipients of data packets sent by the client device 30 using the relative packet rate information from the data that it has itself transmitted, and from the received packet rate information.

The packet rate can be defined, for example, on a basis of the interval of acknowledgements between the server 20 and the client devices 30 and/or by computing a time elapsed between a moment that a last packet of original data was transmitted and a moment when reception of the last data packet is acknowledged. Thus, in addition to the time needed for data transfer, the aforesaid packet rate mechanism is also capable of observing and assessing a time required for processing the received data, and therefore it is feasible for the system 10 to react to changes in processing times and to estimate a CPU processing load experienced at a receiving client device 30 of the system 10.

The system 10 employs a tailor-made acknowledgement scheme that makes it possible to transmit data in a centralized manner, and yet bypassing the server 20. Such a manner of operation is optionally achievable by, for example, using a UDP peer-to-peer communication approach in the system 10. The UDP protocol as such does not use acknowledgements, but just transmits the datagram packets without checking whether they are received or not. Optionally, the UDP peer-to-peer communication method employed in the system 10 attaches an extra message into a last data packet of a connected sequence of data packets that announces to a receiving client device 30 that the sequence ends at the last data packet.

Figure 2:
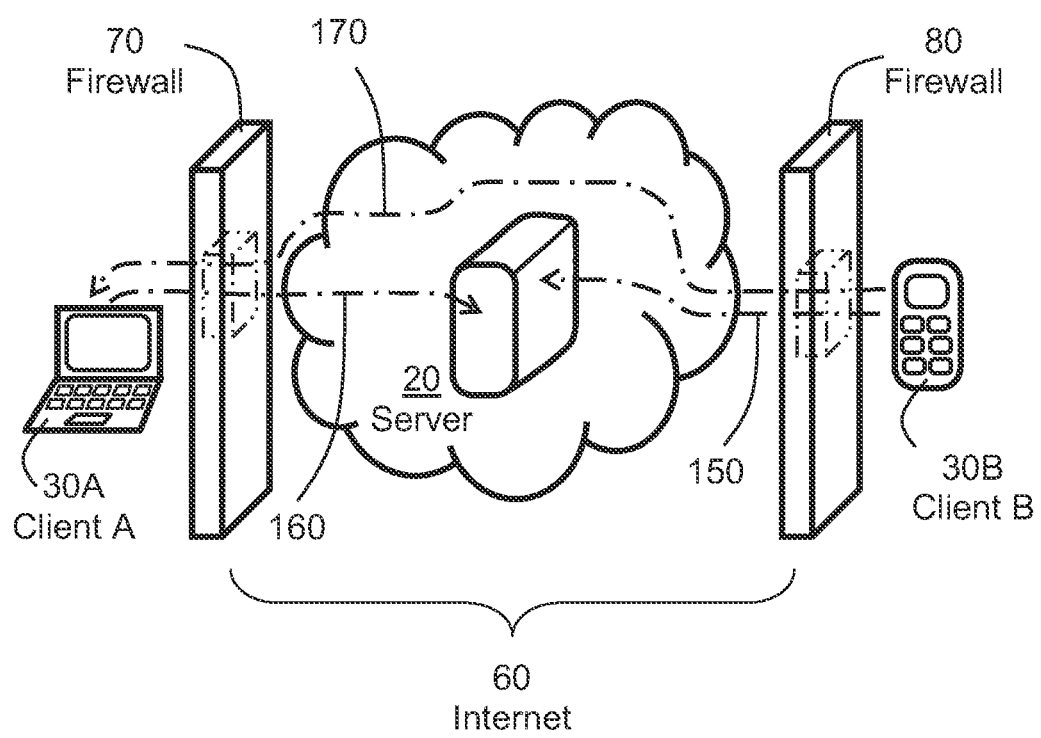
FIG. 2 is an illustration of data exchanges between two client devices A and B via a centralized data server communicating through firewalls, and subsequently circumventing the centralized data server to reducing computer load thereupon.
Figure 3:
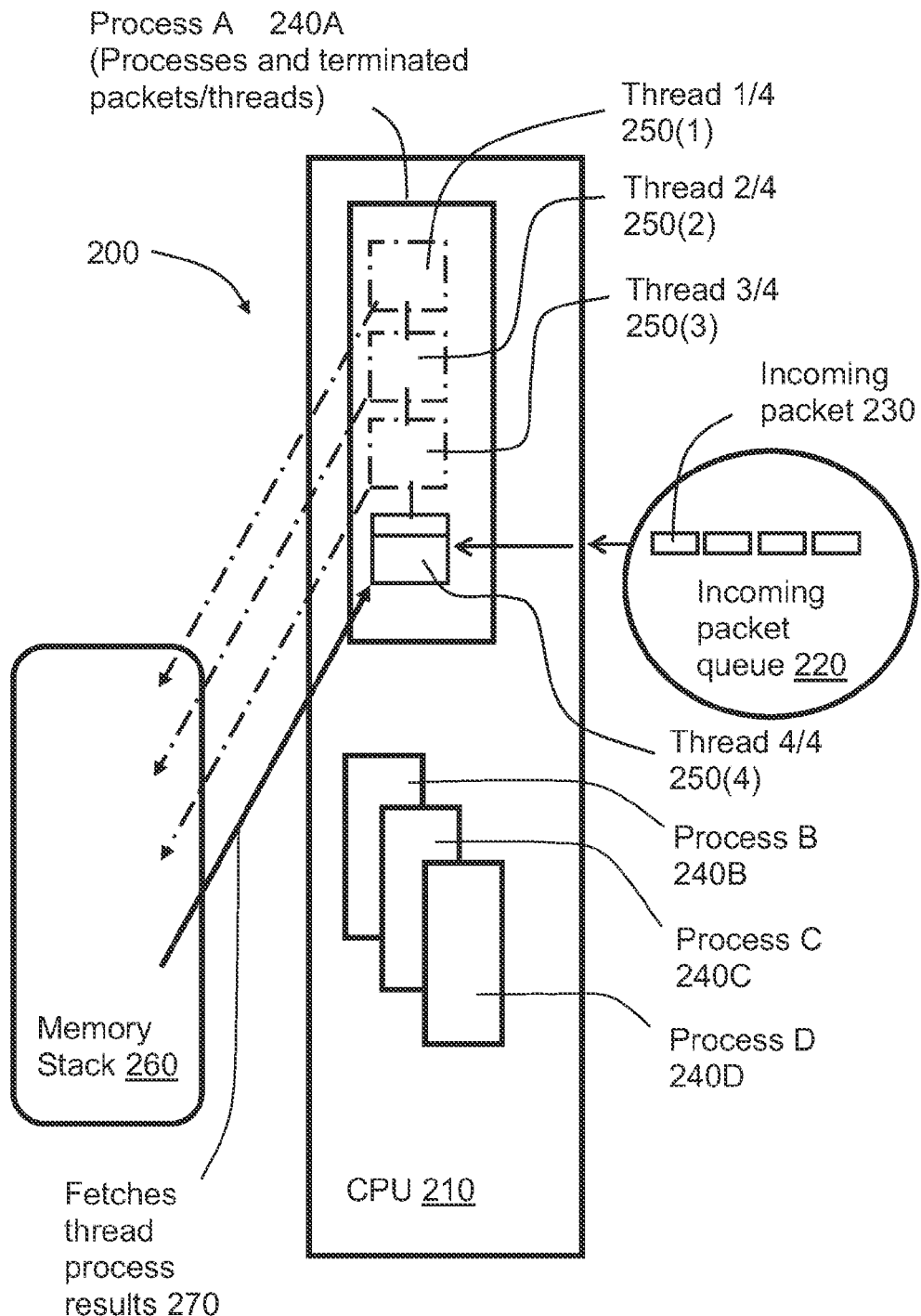
FIG. 3 is an illustration of thread execution associated with processes implemented in the data communication system of FIG. 1.

Moreover, once the UDP transmitter has registered at the server 20 and started communications with a given receiving client device 30 via the server 20, it can thereafter send and receive a remainder of the communication directly with the receiving client device 30. Thus, in FIG. 2, a client device B, denoted by 30B, is desirous to send data via the server 20 and the Internet 60 as a communication network to a client device A, denoted by 30A. The client devices 30A, 30B are protected via corresponding firewalls 70, 80 respectively. Communications 150, 160 enable an initial data exchange to occur between the client devices 30A, 30B via the server 20, and thereafter implemented directly between the client devices 30A, 30B as denoted by a communication 170. Beneficially, data is sent to a peer-to-peer port of the client device 30A operable to receive the data. Data packets sent via the communication 170 are beneficially CPU-managed, as indicated generally by 200 in FIG. 3, by the client devices 30A, 30B. As illustrated in FIG. 3, each data packet type creates a thread 250 of its own inside a software application processing data and executing on a CPU 210. The CPU 210 hosts multiple processes 240, and the threads 250 are controlled via a memory stack 260 of the CPU 210, wherein thread process results are sent from the memory stack 260 to a relevant corresponding thread 250. Incoming data packets 230 are stored in an incoming packet queue 220 which feeds the processes 250. Beneficially, each data packet 230 carries a sequence number in its header, and the last packet of the sequence announces the end of the sequence.

Each received data packet 230 is beneficially processed in its own thread 250 inside the application process 240 executing upon the CPU 210. Moreover, the last data packet 230 in the incoming packet queue 220 raises an event that informs the processes 240 that the entire sequence of data packets 230 has been received in its entirety. For example, if the sequence of data packets 230 includes a hundred data packets, then each packet in a series 1 to 99 is received in their own respective threads 250 and terminated after processing via the CPU 210, but the hundredth data packet 230 is detected as completing the sequence of data packets 230.

The system 10, for example in various different implementations as described in the foregoing, makes it possible to join in mutual communication very different sorts of client devices 30 using communication network infrastructures of mutually different quality into a same real-time communication session, for example a video conferencing session. As more client devices 30 are mobile, wireless devices which have relatively limited processing power that are prone to radio medium noise, the system 10 will become potentially increasingly important in future. Therefore, it is feasible to utilize the system 10 within existing information processing systems, without altering a communication protocol is use in the information processing systems, thereby enabling the system 10 to be implemented readily within existing communication networks, for example the Internet 60. As elucidated in the foregoing, embodiments described in the foregoing makes it possible to communicate in real-time by simultaneously transmitting and receiving both time-critical primary data and non-time-critical secondary data. Such operation enables quality-of-service (QoS) to be achieved, independently of a protocol employed within a communication network supporting operation of the embodiments.

In the system 10, there is enabled a maximum utilization of available communication network infrastructure by optimizing the Maximum Segment Size (MSS), and by prioritizing the data content of these MSS's. A benefit provided in operation in the system 10 is energy saving, because incomplete or partial network data packets 230 are not transmitted. As packet-based communication is increasing, in future, being implemented in battery-powered mobile communication devices, such energy saving is a crucial advantage.

Modifications to embodiments described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A data communication system comprising:
a plurality of communication devices coupled to each other via a communication network arrangement, wherein the plurality of communication devices are operable to exchange data therebetween, wherein the system is operable to allocate the data into a primary type of data and at least a secondary type of data, and wherein the primary type of data is retransmitted substantially immediately therefrom to participating ones of the plurality of communication devices within the system, and at least the secondary type of data is communicated in the system in association with corresponding acknowledgements (ACK) being communicated in the system in response to receipt of the at least secondary type of data at one or more of the plurality of communication devices,
wherein the system is operable to determine communication characteristics of the communication network arrangement and of one or more of the plurality of communication devices, and to adjust a maximum segment size (MSS) of data packet communication to the one or more of the plurality of communication devices as a function of the determined communication characteristics, and
wherein the system is operable to communicate in a manner such that the primary type of data communicated to a first communication device functioning as a server is substantially immediately retransmitted therefrom to one or more second communication devices among the plurality of communication devices.

2. The data communication system as claimed in claim 1, wherein the primary type of data comprises audio data, and the secondary type of data comprises at least one of image data, video data and any other data.

3. The data communication system as claimed in claim 1, wherein the system is operable to determine communication characteristics of the communication network arrangement and/or of one or more of the plurality of communication devices, and to adjust one or more rates of data packet communication to the one or more of the plurality of communication devices as a function of the determined communication characteristics.

4. The data communication system as claimed in claim 1, wherein at least one of the plurality of communication devices is at least one of a wireless-enabled mobile communication device and a wirelessly-connected personal computer (PC).

5. The data communication system as claimed in claim 1, wherein the system is operable to communicate at least tertiary data in a non-time-critical manner between the plurality of communication devices, wherein the at least tertiary data corresponds to at least one of: documents, measurement data.

6. The data communication system as claimed in claim 1, wherein the system is operable to communicate the primary type of data as a highest priority followed by the secondary data as a lower priority.

7. The data communication system as claimed in claim 1, wherein the system is operable on a momentary basis to prioritize the secondary or the tertiary type of data over the primary type of data when communicating to the plurality of communication devices.

8. The data communication system as claimed in claim 1, wherein the communication network arrangement is implemented, at least in part, as a peer-to-peer communication network.

9. The data communication system as claimed in claim 8, wherein the plurality of communication devices are further operable to communicate with each other using a peer-to-peer mode within the peer-to-peer communication network.

10. The data communication system as claimed in claim 1, further comprising a centralized server coupled to the communication network.

11. The data communication system as claimed in claim 10, wherein the primary type of data and the secondary type of data are not communicated to the centralized server when two or more communication devices communicate in the peer-to-peer mode.

12. The data communication system as claimed in claim 11, wherein the two or more communication devices operate in the peer-to-peer mode when the primary type of data and the secondary type of data are used only by a single user.

13. The data communication system as claimed in claim 9, wherein a peer-to-peer connection between two or more communication devices is constructed using a TCP/IP protocol stack, using at least one of a UPnP technology and a TCP Hole Punching technique.

14. The data communication system as claimed in claim 1, wherein the communication network arrangement is implemented, at least in part, via the Internet implementing TCP/IP and/or UDP/IP.

15. The data communication system as claimed in claim 14, wherein the centralized server inspects one or more capabilities of one or more of the communication devices and selects at least one communication device to function as a server for other communication devices.

16. The data communication system as claimed in claim 14, wherein the centralized server arrangement is operable to host one or more services, wherein the one or more services comprises a virtual room, a multipoint server and/or a multiplayer server, such that the system is operable to provide at least one of a video conferencing service, a video broadcasting service, a teleconference service, a multiuser game service, and a video-on-demand service to parties using at least one of the plurality of communication devices.

17. The data communication system as claimed in claim 1, wherein a control command is determined to have a higher priority than one of audio data and video data.

18. The data communication system as claimed in claim 17, wherein the control command is determined to be the primary type of data and one of audio data and video data is determined to be the secondary type of data.

19. A method of communicating data in a data communication system including a plurality of communication devices coupled via a communication network arrangement, the method comprises:
operating the plurality of communication devices to exchange data therebetween, wherein the system is operable to allocate the data into a primary type of data and at least a secondary type of data; and
retransmitting the primary type of data substantially immediately therefrom to participating ones of the plurality of communication devices within the system, and communicating at least the at least secondary type of data in the system in association with corresponding acknowledgements (ACK) being communicated in the system in response to receipt and processing of the second type of data at one or more of the plurality of communication devices;
wherein the method further comprises operating the system to determine communication characteristics of the communication network and of one or more of the plurality of communication devices, and to adjust a maximum segment size (MSS) of data packet communication to the one or more of the plurality of communication devices as a function of the determined communication characteristics; and
wherein the method further comprises operating the system in a manner such that the primary type of data communicated to a first communication device functioning as a server is substantially immediately retransmitted therefrom to one or more second communication devices among the plurality of communication devices.

20. The method as claimed in claim 19, wherein the method further comprises arranging for the primary type of data to comprise audio data, and for the secondary type of data to comprise image and/or video data and/or any other data.

21. The method as claimed in claim 19, wherein the method further comprises operating the system to determine communication characteristics of the communication network arrangement and/or of one or more of the plurality of communication devices, and to adjust one or more rates of data packet communication to the one or more of the plurality of communication devices as a function of the determined communication characteristics.

22. The method as claimed in claim 19, wherein the method further comprises enabling at least one of the one or more communication devices being at least one of a wireless-enabled mobile communication device and a wirelessly-connected personal computer (PC).

23. The method as claimed in claim 19, wherein the method further comprises operating the system to communicate at least tertiary data in a non-time-critical manner between the plurality of communication devices, wherein the at least tertiary data corresponds to at least one of: documents, measurement data.

24. The method as claimed in claim 19, wherein the method further comprises operating the system to communicate the primary type of data as a highest priority followed by the secondary data as a lower priority.

25. The method as claimed in claim 19, wherein the method further comprises operating the system on a momentary basis to prioritize the secondary or the tertiary type of data over the primary type of data when communicating to the communication devices.

26. The method as claimed in claim 19, wherein the method further comprises implementing the communication network arrangement, at least in part, as a peer-to-peer communication network.

27. The method as claimed in claim 26, wherein the method further comprises the operating the system to enable the plurality of communication devices to communicate with each other in a peer-to-peer mode within the peer-to-peer communication network.

28. The method as claimed in claim 27, wherein the method further comprises operating the system in such a manner that the primary type of data and the secondary type of data are not communicated to a centralized server when two or more communication devices communicate in the peer-to-peer mode.

29. The method as claimed in claim 28, wherein method further comprises operating the system in such a manner that the two or more communication devices communicate in the peer-to-peer mode when the primary type of data and the secondary type of data are used only by a single user.

30. The method as claimed in claim 27, wherein the method further comprises constructing a peer-to-peer connection between communication devices using a TCP/IP protocol stack, using at least one of a UPnP technology and a TCP Hole Punching technique.

31. The method as claimed in claim 27, wherein the data communication system further includes a centralized server coupled to the plurality of communication devices via the communication network arrangement, the method further comprising:
   inspecting, by the centralized server, one or more capabilities of one or more of the communication devices and selecting, by the centralized server, at least one communication device to function as a server for other communication devices.

32. The method as claimed in claim 19, wherein the method further comprises implementing the communication network arrangement, at least in part, via the Internet implementing TCP/IP and/or UDP/IP.

33. The method as claimed in claim 19, wherein the method further comprises operating the data server arrangement to host one or more services, wherein the one or more services comprises a virtual room, a multipoint server and/or a multi-player server, such that the system is operable to provide at least one of a video conferencing service, a video broadcasting service, a teleconference service, a multi-user game service, and a video-on-demand service to parties using the at least one of the plurality of communication devices.

34. A computer program product comprising a non-transitory computer readable storage medium having computer readable instructions stored thereon, the computer readable instructions being executable by a computerized device comprising a processor to implement a method of communicating data in a data communication system including a plurality of communication devices coupled via a communication network, the method comprises:
   operating the plurality of communication devices to exchange data therebetween, wherein the system is operable to allocate the data communicated to a centralized server arrangement into a primary type of data and at least a secondary type of data; and
   retransmitting the primary type of data substantially immediately therefrom to participating ones of the plurality of client devices within the system, and communicating at least the secondary type of data in the system in association with corresponding acknowledgements (ACK) being communicated in the system in response to receipt and processing of the at least secondary type of data at one or more of the plurality of communication devices;
   wherein the method further comprises operating the system to determine communication characteristics of the communication network and of one or more of the plurality of communication devices, and to adjust a maximum segment size (MSS) of data packet communication to the one or more of the plurality of communication devices as a function of the determined communication characteristics; and
   wherein the method further comprises operating the system in a manner such that the primary type of data communicated to a first communication device functioning as a server is substantially immediately retransmitted therefrom to one or more second communication devices among the plurality of communication devices.

35. The method as claimed in claim 19, further comprising determining a control command to have a higher priority than one of audio data and video data.

36. The method as claimed in claim 35, further comprising determining the control command to be the primary type of data and determining one of audio data and video data to be the secondary type of data.

* * * * *